June 11, 1968   D. K. CUMMINGS   3,387,664
VARIABLE PITCH PROPELLER
Filed Jan. 10, 1966
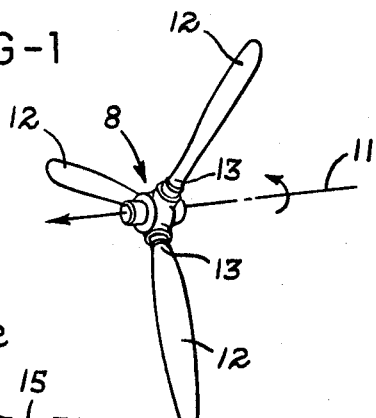
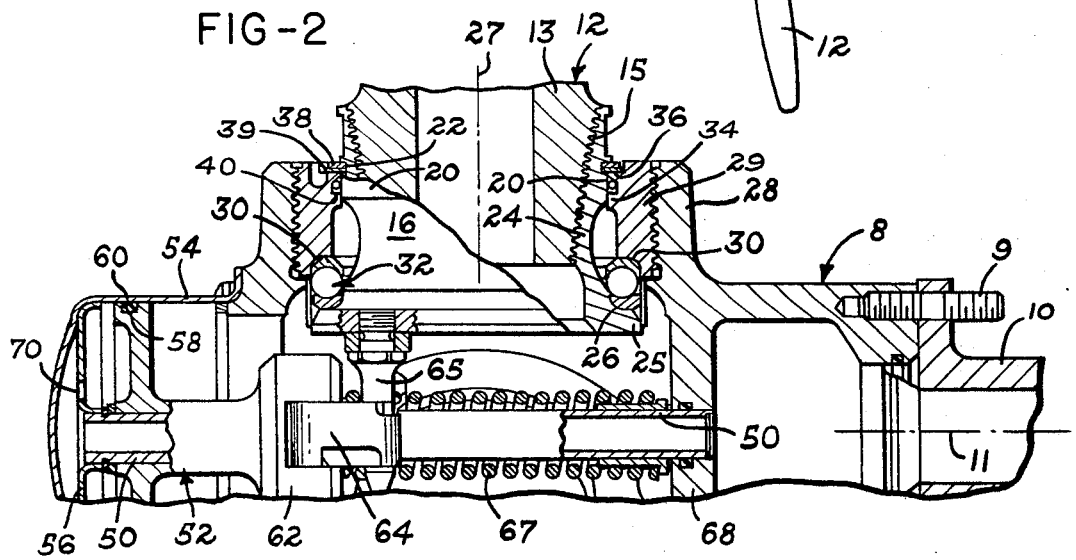
INVENTOR.
DALE K. CUMMINGS
BY
Marechal, Biebel, French & Bugg
ATTORNEYS

United States Patent Office 3,387,664
Patented June 11, 1968

3,387,664
VARIABLE PITCH PROPELLER
Dale K. Cummings, Middletown, Ohio, assignor to The Cessna Aircraft Company, Wichita, Kans., a corporation of Kansas
Filed Jan. 10, 1966, Ser. No. 519,657
4 Claims. (Cl. 170—160.23)

ABSTRACT OF THE DISCLOSURE

Each blade of a variable pitch aircraft propeller is supported by a ferrule having an external cylindrical surface which is closely surrounded by an internal cylindrical surface formed on a retaining nut. A groove is formed on the internal cylindrical surface and has a tapered radially outer wall surface, and a resilient O-ring is retained within the groove slightly stretched over the external cylindrical surface so that centrifugal forces acting on each O-ring produce an effective seal for retaining lubricating fluid with minimum frictional resistance to rotation of the blade.

---

This invention relates to variable pitch aircraft propellers, and more particularly, to an improved seal assembly for use between the base of each propeller blade and the propeller hub to retain lubricant within the hub while minimizing frictional drag.

O-ring seals are commonly used to provide a rotatable fluid tight seal between the root of each blade of a variable pitch aircraft propeller and the propeller hub to prevent leakage of the lubricant enclosed within the hub for lubricating the blade mounting bearings. In the past, the dimensions of the seal and of the retaining groove have been selected in accordance with the standard specification recommended by the manufacturers of O-rings to provide a significant and predetermined cross-sectional squeeze of the seal.

It has been determined, however, that this recommended squeeze of the O-ring seal results in producing substantial frictional drag on the variable pitch propeller mechanism, which in turn significantly effects the pitch changing controls and especially the synchronization of the propellers on multiple engine aircraft. That is, the high break-a-way and moving force required to overcome the friction produced by the squeezed O-ring seal for each blade necessitates over-controlling the pitch changing mechanism, and thus effectively hinders the precision control necessary for obtaining fine incremental changes in blade pitch.

The rotational speed of the propeller is also a factor, although a small one, which affects the frictional drag produced by the squeezed O-ring seal. The centrifugal forces acting on the O-ring due to the mass of the O-ring itself and also due to the outward pressure by the fluid lubricant spaced inwardly of the ring cause the ring to be forced against the outboard surface of the groove which retains the ring and also causes the ring to deflect and be forced against the blade surface and the inner surface of the groove.

Accordingly, it is a primary object of the present invention to provide a variable pitch aircraft propeller including an improved seal assembly between the propeller hub and each of the radially extending blades whereby lubricant is effectively retained within the hub, and the frictional drag of the seal is substantially reduced.

It is also an object of the present invention to provide an aircraft propeller assembly as outlined above including an O-ring seal surrounding the base of each propeller blade and retained within an annular groove having a configuration which provides for low friction between the blade and the seal and, in addition, assures that the seal remain in contact with the blade when the propeller is rotating.

As a more specific object, the present invention provides an improved propeller assembly as outlined above wherein the seal retaining groove has an outer diameter no less than the outside diameter of the ring seal to avoid cross-sectional squeezing of the seal for minimizing the frictional drag produced by the seal.

Still another object is to provide a propeller assembly as outlined above wherein the seal retaining groove is provided with an annular tapered surface to provide a wedging action or radially inwardly forces on the seal when the propeller is rotating to assure that a continuous and uniform seal is maintained around the blade.

Other objects and advantages of the invention will be apparent from the following description, the accompanying drawing and the appended claims.

In the drawings:

FIG. 1 is a perspective view of a three-bladed variable pitch aircraft propeller including an improved seal assembly constructed in accordance with the present invention;

FIG. 2 is an enlarged fragmentary view in part axial section of the propeller hub shown in FIG. 1;

FIG. 3 is an enlarged fragment of FIG. 2 showing the seal assembly under static conditions;

FIG. 4 shows the same assembly as FIG. 3 under dynamic conditions, that is, during the rotation of the propeller;

FIG. 5 is an enlarged fragmentary section similar to FIG. 3 and showing a modified embodiment of the invention; and FIG. 6 is a schematic force diagram illustrating the variable centrifugal force acting on a ring seal as employed in the practice of the invention.

Referring to the drawing, which illustrate preferred embodiments of the invention, the variable pitch propeller shown in FIGS. 1 and 2 generally includes a hub 8 which is adapted to be mounted by the studs 9 on the attachment end of the drive shaft 10 extending from an aircraft engine (not shown) for rotation about an axis 11. The propeller includes a series of blades 12 which extend radially outwardly from the hub 8 and have corresponding base portions 13. Referring to FIG. 2, the root portion 13 of each propeller blade 12 is threaded within the tapered opening 15 of a hollow blade retention ferrule 16. The ferrule 16 is provided with an external cylindrical surface 20, an annular groove 22, and a neck portion 24 which connects with a flange portion 25 defining an annular seat 26.

Formed as an integral part of the hub 8 for rotatably supporting the blades 12 about the corresponding axes 27 (FIG. 6) are a series of radially extending cylindrical bosses 28. Threaded within the bosses 28 are cylindrical blade retention nuts 29 each having an annular seat 30 for retaining the outer race of a ball bearing 32 having an inner race mounted within the annular seat 26. Also formed on the retention nut 29 is an internal cylindrical surface 34 which extends from an annular seat 36 aligned with the groove 22 formed within the ferrule 16. Mounted within the groove 22 adjacent the seat 36 is a snap retaining ring 38 which rests against a washer-like bearing member 39 to prevent the ferrule 16 from shifting inwardly when the propeller is not rotating.

Referring to FIG. 3, formed within the internal cylindrical surface 34 of the retention nut 29 is a continuous groove 40 which is defined by a radially extending annular surface 42, a cylindrical base surface 44 and a frusto-conical or annular tapered surface 45. Mounted within the groove 40 is a resilient sealing ring 46 which preferably is circular in cross-section but may be of other cross-sectional configurations. The inner diameter of the sealing ring 46 is slightly less than the outer diameter of the cylindrical surface 20, thus requiring a slight stretching of the ring thereby assuring that the sealing ring is in continuous contact with the surface 20. For example, in one model propeller, the diameter of the cylindrical surface 20 was approximately 3.962 inch and the internal diameter of the sealing ring 46 was approximately 3.859 inch. Thus the sealing ring 46 was stretched diametrically approximately .103 inch.

As also shown in FIG. 3, the diameter of the cylindrical base surface 44 is somewhat greater than the outside diameter of the sealing ring 46 so that there is no cross-sectional squeezing of the sealing ring 46. For example, the above mentioned propeller was provided with a radial clearance of approximately .060 inch between the outer diameter of the sealing ring 46 and the base surface 44. In addition, the tapered surface 45 was formed on an angle A of approximately 30°, but the angle A may be varied somewhat without significantly affecting the performance of the seal assembly.

The rotation of the retention ferrules 16 within the corresponding retention nuts 29 to provide for simultaneous and uniform changes in pitch of the blades 12 may be accomplished by many different types of mechanisms. However, the hydraulically operated mechanism shown includes an axially extending guide tube 50 on which is slidably mounted a piston 52 which is enclosed within a cylinder 54. An annular support member 56 is mounted within the end of the cylinder 54 for securing and positioning the forward end of the guide tube 50. Formed in the outer periphery of the piston 52 is a continuous groove 58 which retains an O-ring seal 60 adapted to provide sliding contact with the cylinder 54. A hub portion 62 is formed as an integral part of the piston 52 and is connected by a series of pivotal links 64 to the corresponding pins 65 extending inwardly from the flange portions 25 of the blade ferrules 16. An elongated compression spring 67 is mounted on the guide tube 50 and extends from the internal wall 68 of the hub 8 to exert a forward force on the hub 62 of the piston 52 so that the piston will move to the position shown in FIG. 2.

When it is desired to change the pitch of the blades 12, hydraulic fluid is introduced under pressure through the guide tube 50 and then through a series of holes 70 formed in the support member 56 to pressurize the chamber defined between the forward end of the piston 52 and the forward wall of the cylinder 54. This increased pressure moves the piston 52 and integral hub 62 rearwardly against the biasing force of the spring 67 and the centrifugal twisting turning moment force of the blades, causing simultaneous rotation of each of the blades 12 through a somewhat crank action provided by the corresponding links 64 and 65.

When the propeller is rotated, centrifugal forces act on the sealing ring 46 as a result of the mass of the ring itself combined with the pressure exerted by the lubricating fluid such as grease confined within the hub 8 for lubricating the ball bearings 32. As a result, the sealing ring 46 is deformed approximately to the configuration shown in FIG. 4 so that the ring is wedged or cammed between the tapered surface 45 and the cylindrical surface 20 of the blade retaining ferrule 16.

Referring to the schematic diagram of FIG. 6, as a result of the ring seal 46 lying in a plane perpendicular to the blade axis 27, it can be seen that the portions of the ring seal 46 are spaced further out from the rotational axis 11 of the propeller, and thus when the propeller is rotating, the centrifugal force acting on the sealing ring vary in magnitude. Normally, however, these forces are not employed as a significant means of providing for a lubricant seal. On the other hand, it has been a practice in the past to provide a groove which has less width (dimension from surface 20 to surface 44) than the diameter of seal 46 to provide a cross-sectional squeeze that causes relatively high reaction forces on the seal contacting surfaces which in turn causes substantially high frictional drag which, as mentioned above, significantly affects the control over precision incremental changes of blade pitch.

By providing the annular tapered surface 45, it has been found that the camming or wedging action of the centrifugal forces on the sealing ring 46 assures that a positive and continuous contact is maintained between the sealing ring 46 and the surface 20 while providing a relatively light frictional drag between the ring seal 46 and the surface 20.

In accordance with a modified form of the invention as shown in FIG. 5, a flat backup ring 70 is mounted within the groove 40 and is spaced inwardly of the sealing ring 46. This backup ring 70, which is preferably formed of metal, is adapted to float within the groove 40 for providing additional centrifugal force on the sealing ring 46 in an assembly where the centrifugal force resulting from the mass of the sealing ring itself and of the lubricant inwardly of the sealing ring is not sufficient to assure that a positive and continuous contact is maintained between sealing ring 46 and cylindrical surface 20. That is, the mass of the metal backup ring 70 produces an additional controlled radially outwardly directed force on the sealing ring 46 as the propeller is rotated, thereby urging the sealing ring 46 inwardly along the tapered surface 45 of the grooves 40 against the surface 20.

From the drawing and the above description, it can be seen that a variable pitch aircraft propeller constructed with a seal assembly formed in accordance with the present invention provides several desirable features and advantages. Primarily, it has been found that by eliminating the radial or cross-sectional squeezing of the sealing ring 46, the frictional drag between the sealing ring and the blade surface 20 is substantially reduced, and the pitch of the blades can be incrementally adjusted without requiring a substantial increase in fluid pressure within the guide member 50. Thus the substantially lower drag friction between the sealing ring 46 and the cylindrical surface 20 enables the blade retention ferrule 16 to be rotated with a substantially uniform torque since the break-a-way friction is not significantly greater than the turning friction, and total friction has been reduced substantially.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An improved variable pitch aircraft propeller assembly for providing more precise control over changes in pitch by substantially reducing the frictional resistance to incremental and continuous changes in pitch, comprising a propeller hub rotatable about a central axis, a plurality of propeller blades extending radially from said hub, means on the root portion of each said blade defining an external cylindrical surface, means mounting each said blade root portion for rotation on said hub to change pitch, means on said hub defining an internal cylindrical surface closely surrounding each said external cylindrical surface, wall means forming a continuous groove in each said internal cylindrical surface concentric with the associated said blade and including a radially outer wall surface having a frusto-conical configuration, a resilient ring seal positioned within each said groove and mounted on said external surface of the associated said blade so that the inner periphery of said seal is in continuous contact with said external surface, said groove having an outer diameter no less than the outer diameter of said seal as mounted on said external surface and said seal being normally free of cross-sectional squeezing so that as said propeller is rotated, said ring seal is maintained by centrifugal force in contact with said outer wall surface of said groove and with said external cylindrical surface of said blade to provide a seal which effectively retains lubricant within said hub with minimum frictional resistance to rotation of said blade.

2. A variable pitch aircraft propeller as defined in claim 1 including a metal ring spaced within said groove inwardly of said ring seal and adapted to float radially therein so that as said propeller is rotated, said metal ring engages said ring seal by centrifugal force and holds said seal in contact with said external cylindrical surface and said outer wall surface of said groove.

3. A variable pitch aircraft propeller as defined in claim 1 including a ferrule mounted on the root portion of each said blade and having said external cylindrical surface formed thereon, bearing means supporting each said ferrule for rotation on said hub to change pitch, and annular retaining means threadably mounted on said hub and defining said internal cylindrical surface closely surrounding said external cylindrical surface on each said ferrule.

4. A propeller as defined in claim 1 wherein said ring seal mounted on said external cylindrical surface is circular in cross-section and is slightly stretched.

References Cited

UNITED STATES PATENTS 2,530,520   11/1950   Hackethal et al. ___ 170—160.58

FOREIGN PATENTS 181,839   4/1955   Austria.
869,062   10/1941   France.

EVERETTE A. POWELL, Jr., *Primary Examiner.*